United States Patent [19]
Moyers

[11] 3,925,874
[45] Dec. 16, 1975

[54] PIPE GRIPPER
[75] Inventor: Steven M. Moyers, Omaha, Nebr.
[73] Assignee: The United States of America as represented by the United States Energy Research and Development Administration, Washington, D.C.
[22] Filed: July 9, 1974
[21] Appl. No.: 486,924

[52] U.S. Cl................ 29/282; 29/202 R; 29/283
[51] Int. Cl.² ........................................ B23P 19/02
[58] Field of Search.......... 29/264, 282, 283, 202 R; 279/55, 58

[56] References Cited
UNITED STATES PATENTS
2,245,316   6/1941   Amsler................................ 279/58
3,748,718   7/1973   Russell................................ 29/283
3,863,322   2/1975   Russell................................ 29/283

Primary Examiner—Harold D. Whitehead
Assistant Examiner—Harold P. Smith, Jr.
Attorney, Agent, or Firm—Dean E. Carlson; Arthur A. Churm; Paul A. Gottlieb

[57] ABSTRACT

A device for gripping the exterior surface of a pipe or rod has a plurality of wedges, each having a concave face which engages the outer surface of the pipe and each having a smooth face opposing the concave face. The wedges are seated on and their grooved concave faces are maintained in circular alignment by tapered axial segments of an opening extending through a wedge-seating member. The wedges are allowed to slide across the tapered axial segments so that such a sliding movement acts to vary the diameter of the circular alignment.

2 Claims, 5 Drawing Figures

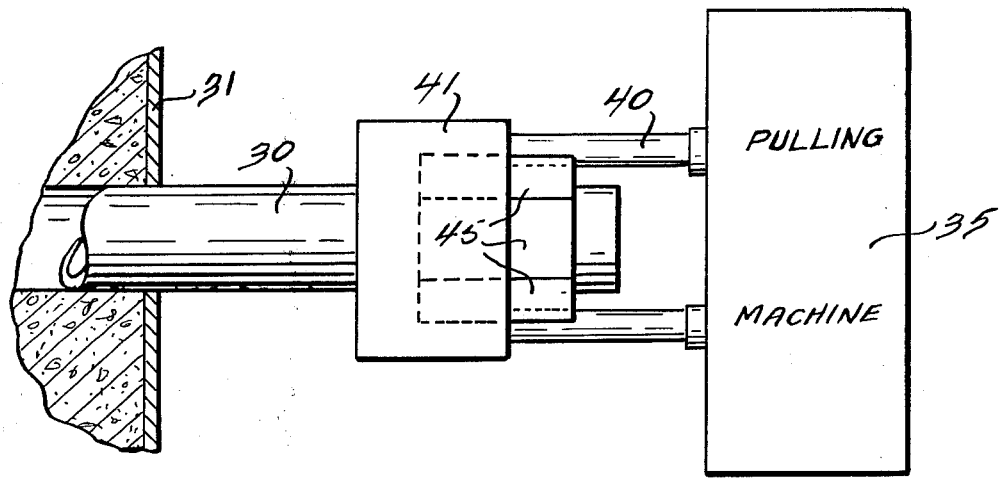
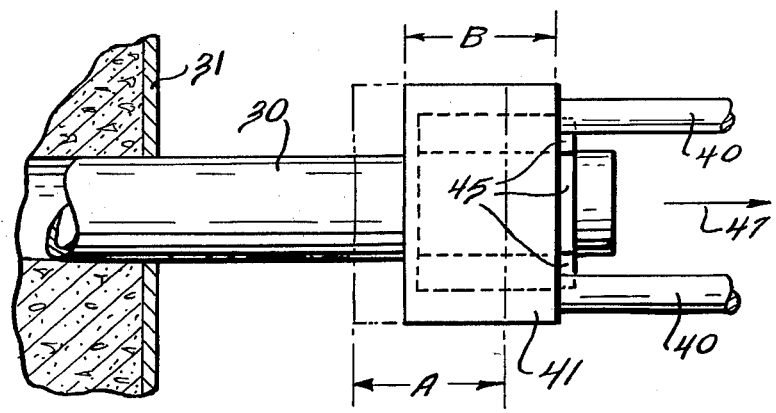
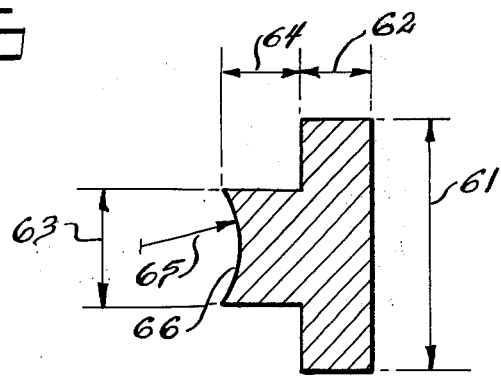

PIPE GRIPPER

CONTRACTUAL ORIGIN OF THE INVENTION

The invention described herein was made in the course of, or under, a contract with the UNITED STATES ATOMIC ENERGY COMMISSION.

BACKGROUND OF THE INVENTION

Exertion of high longitudinal forces on piping and tubing is limited by the ability to transmit force from a force-generating device such as a pulling machine to the pipe itself. The transmission of force breaks down at the point of engagement between the surface of the pipe and the gripping tool. Slippage of the gripping tool over the pipe surfaces and structural failure of the pipe under great gripping force are the limiting factors on gripping capability.

Maintenance of nuclear reactors requires removal of tube sleeves which house and support reactor process tubing. These tube sleeves, which extend through the inner and outer walls of the reactor, become lodged in place by the shifting and corroding of the cast iron thermal shield and graphite blocks within the reactor walls, making removal of the tube sleeves difficult. Great force, on the order of 60,000 pounds, needs to be transmitted from the pulling machine to the tube sleeves to dislodge them.

It is therefore an object of this invention to provide an exterior gripping tool capable of transmitting large forces from a force-generating device to a tube.

BRIEF DESCRIPTION OF THE INVENTION

A plurality of wedges are provided, with each having one concave face and a smooth face opposing the concave face. The wedges are seated in slidable contact upon tapered segments of the interior surface of an opening extending from one side to an opposing side of a wedge-seating member. The taper and direction of taper of each segment are equal with respect to a longitudinal axis extending through the opening so that with the wedges seated upon the tapered segments, the concave faces of the wedges are maintained in circular alignment about the longitudinal axis. Movement of the wedge-seating member will cause the tapered segments to slide across the smooth faces of the wedges and thereby vary the diameter of the circular alignment of concave wedge faces to grip or release a pipe inserted in the opening.

BRIEF DESCRIPTION OF THE DRAWINGS

FIG. 1 is a view of the pipe gripper coupled to a pulling machine;

FIG. 4 is a view showing the movement of the pipe gripper when a pulling force is applied; and FIG. 5 is a transverse view of a wedge.

DETAILED DESCRIPTION OF THE INVENTION

Figure 2:
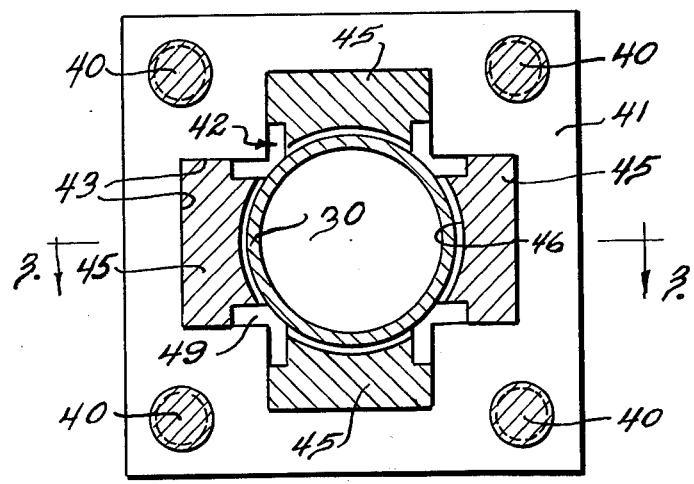
FIG. 2 is a transverse view of the pipe gripper.

Referring to FIG. 1, there is shown a pipe-gripping tool coupled to a pulling machine for transmitting great force from the pulling machine to a pipe or solid rod. Pipe 30 extends from wall 31 which may be the wall of a nuclear reactor having process tubes passing through the wall. The pulling machine 35 which is a device capable of developing high longitudinal force is coupled via connection bolts 40 to the pipe gripper which is positioned about pipe 30. Connection bolts 40 are mounted on seating member 41 which serves as a seating device for wedges 45.

Figure 3:
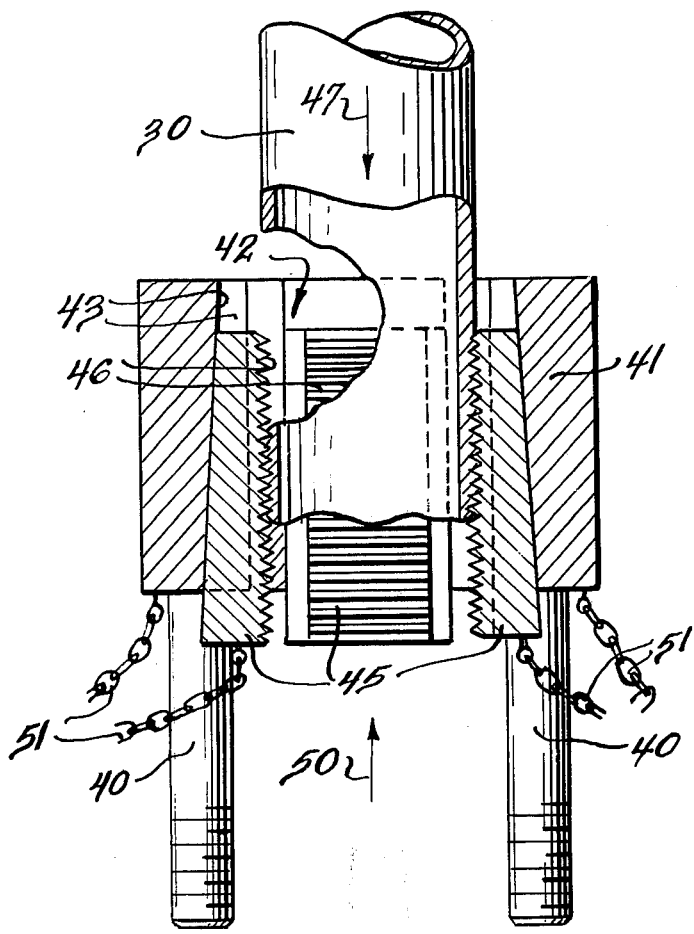
FIG. 3 is a sectional view taken on line 3—3 of FIG. 2.

Referring to FIGS. 2 and 3, there is shown the pipe gripper. The pipe gripper, positioned about pipe 30, is mounted to the pulling machine (not shown) via connection bolts 40 which are mounted on seating member 41. In this embodiment, seating member 41 has a cruciform opening 42 extending longitudinally from one end to an opposing end. The interior surfaces 43 of cruciform opening 42 are tapered equally and in the same direction from one end of opening 42 to the other. The interior surfaces 43 of the tapered segments of cruciform opening 42 are smooth so that wedges 45 which are seated within each quadrant of cruciform opening 42 are free to slide across surfaces 43. The faces of wedges 45 which contact surfaces 43 are also smooth to facilitate the sliding. The exposed face 46 of each wedge is concave and grooved. With a wedge 45 seated in each quadrant of seating member 41 the exposed, concave, grooved faces 46 of each wedge form a circular alignment which will encompass a pipe or rod 30 which is inserted through opening 42 in seating member 41. Note that a completed circle of faces is not necessary. If there is a projection on the pipe, a nonsymmetrical arrangement forming a partial circle is satisfactory.

Referring to FIG. 4, along with FIGS. 2 and 3, to grip a pipe or solid rod with the pipe gripper, the gripper is positioned about the pipe. Force is applied via connection bolts 40 to seating member 41 in the direction indicated by arrow 47, away from the end of the pipe. As this gripping force is applied to seating member 41, it moves from position "A" to position "B" while wedges 45 remain axially stationary. The grooved faces 46 of wedges 45, which surround the pipe in circular alignment, engage the exterior surface of the pipe along the entire length of each wedge. This engagement is caused by the motion of seating member 41. As seating member 41 moves from position "A" to "B," the smooth interior surfaces 43 of opening 42 slide across the smooth faces of wedges 45. Because of the decreasing cross-sectional area of opening 42 due to its taper, wedges 45 are forced to radially contract and their grooved faces 46 dig into the exterior surface of the pipe. Note that, while best gripping is obtained with faces 46 grooved, a strong friction grip may be achieved if faces 46 are not grooved. In either case, the more force applied by the pulling machine to the seating member the greater the tendency of the wedges to grip the pipe. Force is transmitted to the pipe both radially inward and longitudinally from the pulling machine.

As seating member 41 slides across wedges 45, the wedges are held in position by the cruciform shape of opening 42. As the diameter of the circular alignment of grooved wedge faces 46 narrows because of the radial contraction, gaps 49 in the alignment will become narrower and the wedges will abut. This abutment will limit further radial contraction. Limited contraction is necessary to inhibit crushing or splitting of the pipe which would loosen the grip. To release the gripper, a small force is applied to seating member 41 in the direction of arrow 50 which is opposite to the direction of the force necessary for gripping. This allows the circular alignment of faces 46 to expand and lessen the grip. When complete release is achieved, chains 51 coupling wedges 45 to seating member 41 prevent loss of wedges 45.

The diameter of the circular alignment of grooved wedge faces should generally conform to the outside diameter of the pipe being gripped. The minimum size of outside diameter of pipe which can be gripped is generally limited by the abutting of wedges as previously described, in that the abutting limits radial contraction of the circular alignment. Maximum pipe size which can be gripped is generally limited by the size of the opening in the seating member. In addition, it is beneficial to gripping if the curvature of the concave face of each wedge approximates the circumference of the pipe. Therefore, there is a preferred range of pipe size to which a group or set of related wedges is adaptable. Sets of wedges of different sizes will have different preferred ranges. This is illustrated in FIG. 5, which shows a representative wedge of a particular set of wedges for gripping a pipe. Dimensions 61 and 62 of the wedge are the same regardless of which set the wedge is a member of, so that only one size of seating member is needed. Dimensions 63, 64 and the curvature 65 of the concave, grooved surface 66 are the variable factors which determined what preferred range of pipe sizes can be gripped by a particular set of related wedges. For smaller pipe ranges, dimension 63 and the radius of curvature 65 of surface 66 are decreased, while dimension 64 is increased. For larger pipe ranges, dimension 63 and the radius of curvature 65 of surface 66 are increased, while dimension 64 is decreased. Therefore, by providing several sets of related wedges adaptable to one seating member, an increased range of pipe sizes can be gripped.

In practice, the gripper has been able to transmit forces as high as 65,000 pounds to the tube sleeves. Only one attendant is needed to position the tool and operate the pulling machine.

The embodiments of the invention in which an exclusive property or privilege is claimed are defined as follows:

1. A tool for gripping the exterior surface of a pipe to enable an axial force to be transmitted to the pipe, comprising:

a wedge-seating member having a first side and a second side opposite said first side, said wedge-seating member having a hole in the shape of a cruciform extending therethrough from said first side to said second side capable of receiving said pipe, said hole having a longitudinal axis with each end interior surface of the branches of said cruciform hole forming axial seating surfaces positioned symmetrically about said longitudinal axis in substantially circular alignment, said wedge-seating member having coupling bolts extending from said first side axial to said longitudinal axis, a pulling machine coupled to said coupling bolts for applying force thereto axial to said longitudinal axis, each of said seating surfaces being equally tapered with respect to said longitudinal axis in the same direction from said first side toward said second side, and a plurality of wedges each having two ends, a seating face and a grooved concave face opposing said seating face, each of said seating faces being tapered from one end of said wedges to the other with the same degree of taper as said seating surfaces so that with a pipe inserted into said hole, and each of said seating faces in sliding contact with one of said seating surfaces, said concave faces are maintained in substantially circular alignment about said longitudinal axis, and whereby force applied by said pulling machine to said coupling bolts in a first direction from said first side to said second side causes axial sliding of said seating faces across said seating surfaces, thereby decreasing the diameter of said circular alignment and tending to grip the pipe, the decrease in diameter of said circular alignment being limited by the abutting of adjacent concave faces, and force applied to said wedge-seating member opposite in direction to said first direction thereby causes axial sliding of said seating faces across said seating surfaces in the direction from said second side to said first side increasing the diameter of said circular alignment tending to release the pipe.

2. The pipe gripper of claim 1, wherein said plurality of wedges comprise a wedge set, said wedge-seating member capable of seating a plurality of wedge sets, each set of said plurality of wedge sets being distinguishable from any other set by the radius of curvature of said concave face, by the chordal length of said concave face and by the depth of said wedge measured perpendicularly from said concave face, with each set of wedges capable of gripping a different range of outside diameters of pipe.

* * * * *